C. F. WASHBURN.
BARBED FENCE WIRE.

No. 249,212. Patented Nov. 8, 1881.

WITNESSES:
Julius Wilckie
N. H. Sherburne

INVENTOR:
Charles F. Washburn
By Gridley & Sherburne
Attys

UNITED STATES PATENT OFFICE.

CHARLES F. WASHBURN, OF WORCESTER, MASSACHUSETTS.

BARBED FENCE-WIRE.

SPECIFICATION forming part of Letters Patent No. 249,212, dated November 8, 1881.

Application filed March 29, 1876.

*To all whom it may concern:*

Be it known that I, CHARLES F. WASHBURN, of Worcester, in the county of Worcester and State of Massachusetts, have invented new and useful Improvements in Barbed Fence-Wire; and I do hereby declare the following to be a full, clear, and exact description thereof, which will enable others skilled in the art to which my invention appertains to make and use the same, reference being had to the accompanying drawings, forming a part of this specification, in which—

Figure 1:
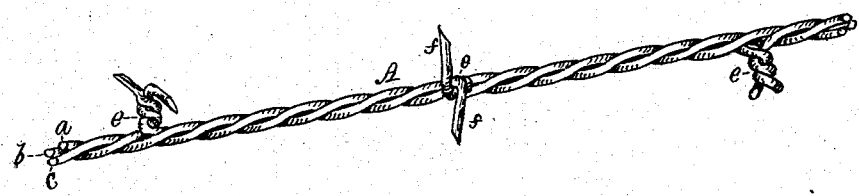
Figure 2:
Figure 3:
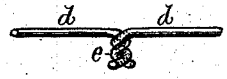

Figure 1 represents an isometrical view of a barbed fence-wire embodying my invention. Fig. 2 represents a cross-section of the same; and Fig. 3 represents an isometrical view of the wire strand forming the barbs.

Like letters of reference indicate like parts.

My invention relates to that class of fence-wire consisting of two or more strands twisted together and provided with sharp-pointed barbs for the purpose of preventing cattle, horses, and other animals from rubbing against the wires constituting the rails of the fence, or from attempting a passage through or between them.

Heretofore one of the barbed-wire fences of this class has been made of two strands, each strand of short sections, the ends of each section hooked to the adjoining one by a bent end, and the bent ends thrown out on each side of the fence at the point of junction. This produces a guard of some value; but this hooking of each wire at short intervals by bent ends materially diminishes the strength of the whole, the structure being liable to be rendered comparatively useless and also objectionable by changing temperatures and other causes bringing a strain thereon, whereby the hooked joints are loosened and the barbs disarranged.

The object of my present invention is to produce a barbed-wire cable which shall be both strong and free from the objections incident to the sectional fence before referred to and yet have the barbs formed from the ends of the sections from which one of the strands is made.

My invention consists in the combination, in a barbed fence wire or cable, of one wire strand made or constructed from sections with the ends intertwisted together in a spiral or screw form, and the points left projecting laterally to form barbs with one or more continuous wires, the whole being twisted or cabled together, substantially as shown and hereinafter described.

In the drawings, A represents a completed section of my improved barbed fence-wire when composed of three strands of wire, *a*, *b*, and *c*, two of them being continuous wires. One of said wires or strands, as before stated, is made of series of short sections or pieces, *d*, pointed at each end, and the end of one section is intertwisted with the end of its adjacent piece or section *d*, as shown at *e*, the pointed ends thereof projecting in opposite directions from the plane of the intertwist uniting the respective sections, as shown at *f*, Fig. 2 of the drawings.

In constructing my said barbed fence-wire I make the separate strands of any suitable wire of the proper size to insure the necessary strength. The strand of which the barbs are formed is cut in sections, but longer than the desired distance between the barbs, so that when the sections are intertwisted together to form a continuous strand, in addition to the intertwisted portions, their ends will project from such intertwisted portion a distance sufficient to form the desired length of the barbs. The ends of the sections, after being intertwisted together, are bent in one plane, so as to project in opposite directions laterally from the plane of the strand when the several strands are twisted together to complete the wire. One or more of the strands being made of continuous wires, I produce a fence-wire of great strength and at less expense in many respects than can be done with that class of barbed wire in which the barbs are made from separate short pieces and then secured separately upon one or more of the main wires. Besides, in my said barbed wire the barbs are stiff and permanent, and are not liable to be displaced by use in consequence of the changing temperature or the strain that may be brought to bear upon it by contact of stock therewith.

As the intertwisted portions of the section *d* extend out from the cable or main twisted fence-wire some distance, a fence made from my said improved barbed wire presents such an appearance as to attract more quickly the attention or notice of stock than the ordinary styles of barbed wire in use prior to my invention. Consequently there is less danger of stock being injured when confined in fields fenced with my wire than there would be if the old styles of barbed wire were used. Then, again, as I use one or more continuous wires, when the fence is put up and strained taut, even if only one continuous wire is used, the tension on the intertwisted portions $e$ causes such intertwisted portions to lock more firmly, and that, too, without in any way turning the barbs out of their proper position. Should the single main continuous wire break in use, (and it must break before the strain comes upon the sectional strand to an injurious degree,) the intertwisted portions $e$ of the sectional wire will be so firmly and compactly formed as to still give to the fence great utility and practical value, while, when two continuous wires are used, as represented in the drawings, the fence is very strong, compact, and firm, the intertwisted portions $e$ of the sections $d$ being supported by the two continuous strands, one on each side thereof.

It will be observed that the intertwisted and extended portions $e$ support the barbs at such a distance from the longitudinal wires that it requires but little power applied to the points of the barbs to give a strand of wire fastened at points fifteen feet apart a slight rotation upon its axis, and consequently my said improved barbed wire is not so apt to tear and inflict deep flesh-wounds upon stock that happen to run or are pushed against it, as would be the case if the barbs were close down to or projected out from the same plane of the main wires.

I am aware that Letters Patent No. 146,671 were granted to Jacob Haish January 20, 1874, for improvement in wire fences, and I hereby disclaim the devices and construction shown and described in said Letters Patent.

Having described my invention or improvement in barbed fence-wire, what I claim therein as new and of my invention, and desire to secure by Letters Patent, is—

1. The combination, in a barbed fence-wire, of one wire strand made or constructed from sections with their ends intertwisted together, as shown and described, and their sharp or pointed ends bent to project laterally to form barbs, with one or more continuous wire strands twisted with the said sectional barbed strand, substantially as shown and described, and for the purposes set forth.

2. The combination, in a barbed fence-wire, of a single wire strand the pointed ends of which are intertwisted together and then bent to project laterally to form barbs, with two continuous wire strands twisted with and supporting said barbed sectional strand, substantially as and for the purposes set forth.

The above specification of my invention signed by me this 23d day of March, 1876.

CHARLES F. WASHBURN.

Witnesses:
 N. C. GRIDLEY,
 N. H. SHERBURNE.